United States Patent
Hechler-Stabbert et al.

(10) Patent No.: US 8,480,388 B2
(45) Date of Patent: Jul. 9, 2013

(54) INJECTION MOULDING TOOL FOR THE MANUFACTURE OF A HYBRID COMPONENT

(75) Inventors: Gerald Hechler-Stabbert, Berlin (DE); Alexander Schult, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 76 days.

(21) Appl. No.: 13/204,455

(22) Filed: Aug. 5, 2011

(65) Prior Publication Data
US 2012/0034333 A1   Feb. 9, 2012

(30) Foreign Application Priority Data
Aug. 9, 2010   (DE) .......................... 10 2010 033 759

(51) Int. Cl.
*B29C 45/16*   (2006.01)
(52) U.S. Cl.
USPC ........... 425/112; 425/117; 425/123; 425/127; 425/129.1
(58) Field of Classification Search
USPC .................. 425/112, 117, 123, 127, 129.1
See application file for complete search history.

(56) References Cited

U.S. PATENT DOCUMENTS

| | | | |
|---|---|---|---|
| 5,415,536 A * | 5/1995 | Ohno ............................ | 425/121 |
| 6,413,069 B2 * | 7/2002 | Oono et al. .................... | 425/112 |
| 6,915,570 B1 | 7/2005 | Ohgoshi et al. | |
| 7,005,103 B2 * | 2/2006 | Smith et al. ................... | 264/510 |
| 7,018,190 B2 * | 3/2006 | Okamoto et al. ............. | 425/127 |
| 7,458,793 B2 * | 12/2008 | Toyooka et al. ............... | 425/112 |
| 2010/0080710 A1 | 4/2010 | Schreiber | |

FOREIGN PATENT DOCUMENTS

| | | |
|---|---|---|
| DE | 60031851 | 3/2007 |
| EP | 0776749 | 6/1997 |
| EP | 2113358 | 11/2009 |
| JP | 2007307769 | 11/2007 |

OTHER PUBLICATIONS

European Search Report dated Nov. 30, 2011 from counterpart application.
German Search Report dated Mar. 15, 2011 from counterpart application.

* cited by examiner

*Primary Examiner* — Tim Heitbrink
(74) *Attorney, Agent, or Firm* — Timothy J. Klima; Shuttleworth & Ingersoll, PLC

(57) ABSTRACT

Injection molding tool for the manufacture of a plastic element sheathed with a sheet-metal shell (8), where the gate (12) which is designed as an integral part of the lower mold half (9) for correct positioning and supply of the plastic melt projects beyond the inner surface of the mold half (9) into the sheet-metal shell having a positioning opening (14), such that the plastic melt is discharged inside the sheet-metal shell and does not flow past it. A sealing groove (18) adjoining the gate and integral with the mold half, said groove receiving a sealing ring (17) elastically deformable under the effect of the internal pressure on the sheet-metal shell, forming a rigid sealing edge (19) to the sheet-metal shell and at the same time performing the function of a labyrinth seal together with a gap (16) remaining between the positioning opening and the gate, also ensures that the plastic melt does not flow past the sheet-metal shell and that the sheet-metal shell is sealed to the outside such that the high internal pressure required to shape the sheet-metal shell can be generated by the continued flow of the plastic melt.

20 Claims, 2 Drawing Sheets

INJECTION MOULDING TOOL FOR THE MANUFACTURE OF A HYBRID COMPONENT

Figure 1:
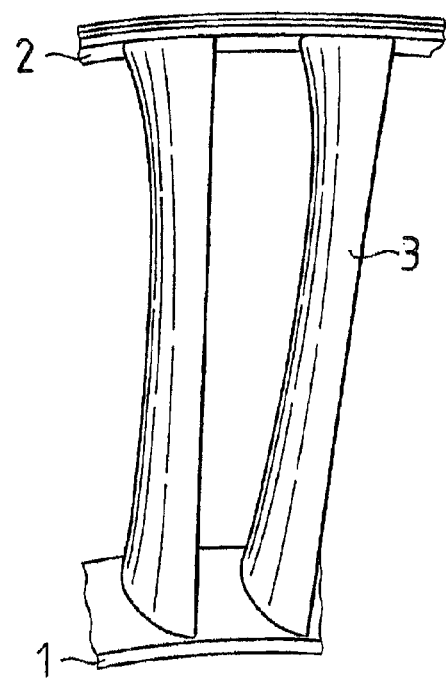

This invention relates to an injection moulding toot for the manufacture of a hybrid component including a plastic element sheathed with a sheet-metal shell, in particular a guide vane arranged inside the bypass flow duct of a gas-turbine engine, with the tool consisting of two mould halves having an inner contour matching the shape of the component and a gate for injecting a plastic melt into the sheet-metal shell.

A method is known from EP 2113358 A1 for manufacturing the guide vanes for a guide vane nozzle stator arranged downstream of the fan of an aircraft gas turbine, where two sheet metal sections welded to one another at the edges are placed inside an injection moulding tool and where a plastic material is injected into the area remaining between them by an injection moulding device. The sheet-metal sections are shaped to match the inner contour of the two mould halves by the internal pressure generated during injection of the plastic melt. The plastic material is injected into the sheet-metal shell via a front-side gate. The process and the gate concept used therein are disadvantageous in that the plastic melt might flow around the sheet-metal shell during injection as a result of sealing problems, and in that the pressure build-up inside the sheet-metal shell required for complete shaping of the component is not assured.

The present invention, in a broad aspect, provides an injection moulding tool of the type specified at the beginning such that flow around the sheet-metal shell during injection of the plastic melt is prevented and at the same time a complete shaping of the component to match the contour of the moulding tool is assured thanks to a sufficiently high internal pressure.

It is a particular object of the present invention to provide solution to the above problems by an injection moulding tool designed in accordance with the description herein.

Advantageous embodiments of the present invention become apparent from the description below.

On the basis of an injection moulding tool of the type specified at the beginning, the underlying idea of the invention is that a gate designed as an integral part of the lower mould half for correct positioning and supply of the plastic melt projects beyond the inner surface of the mould half into the sheet-metal shell having a positioning opening, such that the plastic melt is discharged inside the sheet-metal shell and does not flow past it. A sealing groove adjoining the gate and integral with the mould half, said groove receiving a sealing ring elastically deformable under the effect of the internal pressure on the sheet-metal shell, forming a rigid sealing edge to the sheet-metal shell and at the same time performing the function of a labyrinth seal together with a gap remaining between the positioning opening and the gate, also ensures that the plastic melt does not flow past the sheet-metal shell and that the sheet-metal shell is sealed to the outside such that the high internal pressure required to shape the sheet-metal shell can be generated by the continued flow of the plastic melt.

In an embodiment of the invention, the cross-sectional surface of the sealing groove is determined by a side running substantially vertically along the gate connector and by a side extending obliquely to the inner surface of the mould half, with the sealing edge forming an obtuse angle.

In a further embodiment of the present invention, the gate is provided in an edge area of the lower mould half and is associated with a separable edge area of the component.

In an expedient further embodiment of the invention, the gate has a conically opening gate runner.

In an advantageous development of the invention, the gate projects beyond the inner surface of the lower mould half to the extent that its molten material exit opening is above the inner surface of the sheet-metal shell. For example, the gate may project at least 2 mm beyond the inner surface of the lower mould half.

The sealing ring, designed as an O-ring, is made of a heat-resistant material.

Figure 2:
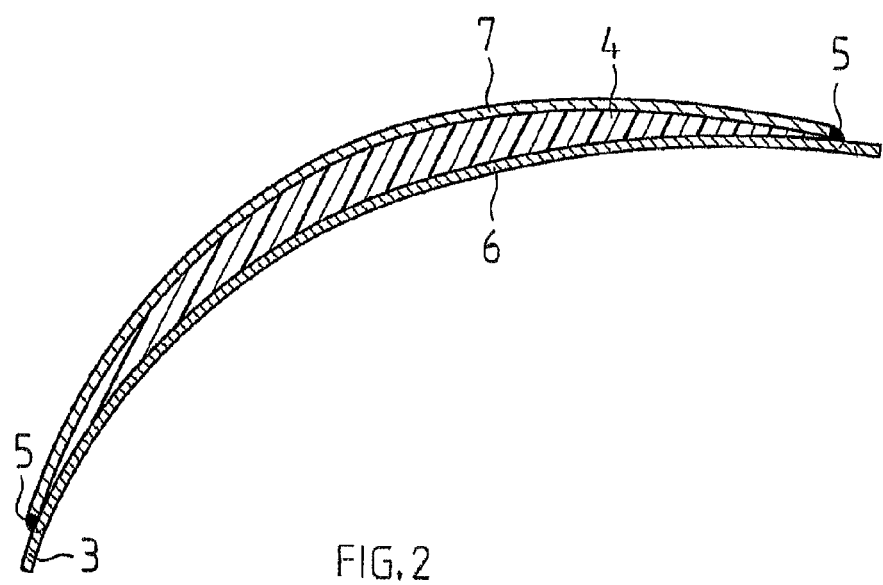
Figure 3:
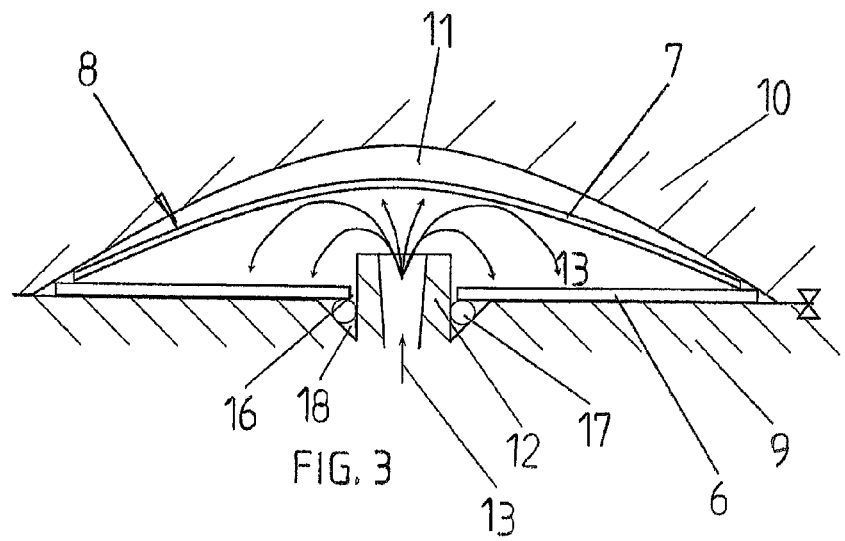
Figure 4:
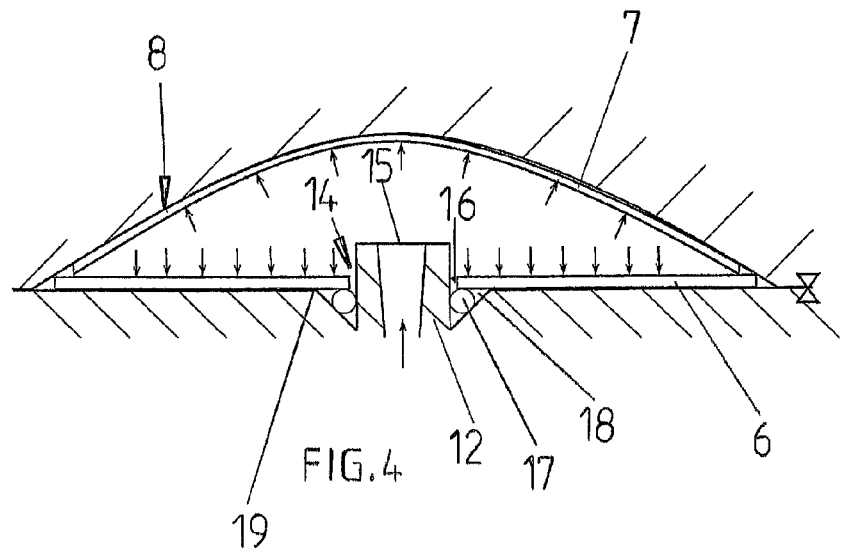
Figure 5:
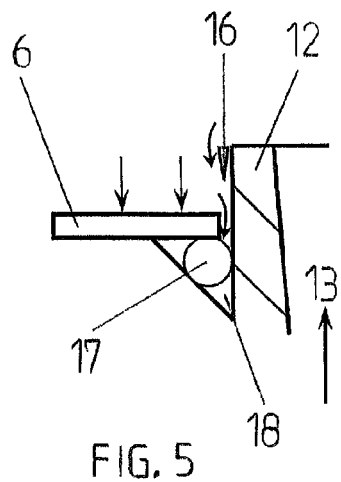
Figure 6:
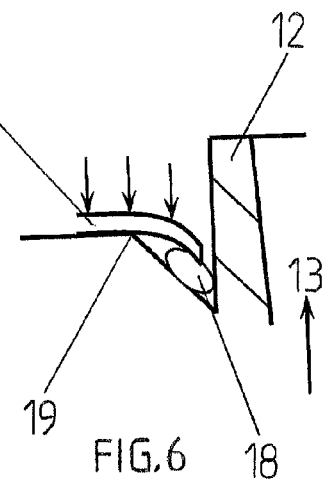

The present invention is more fully described in light of the accompanying drawing showing a preferred embodiment. In the drawing, FIG. 1 shows a partial view of a guide vane nozzle stator with guide vanes arranged between an inner and an outer segment, FIG. 2 shows a sectional view of a guide vane, FIG. 3 is a schematic representation of an injection moulding tool showing the initial phase of the injection process for the manufacture of a guide vane designed as a hybrid component, FIG. 4 shows the injection moulding tool as per FIG. 2 after further infiltration of the plastic melt and during complete shaping of the sheet-metal shell, FIG. 5 is a detail view of the sealing in the area of the gate, and FIG. 6 is a detail view of the sealing as per FIG. 4, however at a time of increased internal pressure during complete shaping of the sheet-metal shell.

The guide vanes 3 shown in FIG. 1 and arranged between an inner segment 1 and an outer segment 2 are integral parts of a guide vane nozzle stator fitted downstream of the fan inside the bypass flow duct of a gas-turbine engine. The guide vanes 3 each comprise a plastic element 4—here consisting of glass fiber-reinforced polyamide—sheathed with a sheet-metal shell 8 formed from two thin foil-type metal sheets 6, 7 connected by welds 5.

The manufacture of the guide vanes 3 thus formed is achieved in an injection moulding tool illustrated schematically in FIGS. 3 to 6 and including two mould halves 9, 10—nozzle side and movement side (top and bottom)—moveable relative to one another. With a closed injection moulding tool, the two mould halves 9, 10 enclose a mould cavity 11—here shown in simplified form—whose inner contour matches the outer contour of the guide vane 3 to be produced. In the bottom mould half 9, a gate 12 projecting beyond the level of the inner surface of the bottom mould half 9 is provided and is connected to an injection moulding device (not shown) in order to supply a plastic melt (arrow 13) consisting, in accordance with the present exemplary embodiment, of fiber-reinforced polyamide.

To manufacture the hybrid component (in this case the guide vane 3), first the prefabricated sheet-metal shell 8 is inserted into the bottom mould half 9. The projecting gate 12 is used here additionally for correct positioning of the sheet-metal shell 8 provided with a positioning opening 14, into which the gate 12 projects with a clear distance of the ingate 15 from the inner surface of the lower sheet 6 of the sheet-metal shell 8. This ensures that the plastic melt (arrow 13) supplied by the plastifier unit after closing of the injection moulding tool (9, 10) actually enters the sheet-metal shell 8 (FIG. 3) and does not flow past it.

Sealing in the area of the gap 16 remaining between the opening 14 and the gate 12 is achieved by means of a sealing ring 17 made of a heat-resistant material and placed inside a sealing groove 18 integral with the bottom mould half 9 and directly adjoining the gate 12. The cross-sectional surface of the sealing groove 18 is determined by a substantially vertical side running along the gate 12 and—after a rounded transition—by a side running obliquely to the inner surface of the bottom mould half 9. A sealing edge 19, defined by an obtuse angle and contacting the sheet-metal shell 8, is formed at the transition from the inner surface of the bottom mould half 9 and the sealing groove 18. The narrow gap 16 between the positioning opening 14 and the gate 12 forms, together with the adjoining large cross-section of the sealing groove 18, a labyrinth seal. With the further continued flow of the plastic melt into the sheet-metal shell 8, a gradually increasing internal pressure builds up inside the latter by which the sheet-metal shell 8 is further expanded and fully shaped by a further increase in internal pressure up to the inner contour of the two mould halves 9, 10 of the injection moulding tool. At high internal pressure too, sealing by the system formed from the sealing groove 18 and the sealing ring 17 is assured, since the sheet 6 of the sheet-metal shell 8 is pressed onto the sealing ring in the area of the sealing groove 18 and shapes the latter, and at the same time an edge pressure further increasing the sealing effect is generated at the sealing edge 19 of the sealing groove 18 surrounding the gate 12. This means that with increasing internal pressure the sealing effect is further improved such that a steady shaping pressure can be exerted on the sheet-metal shell 8 until it is completely shaped up to the inner contour of the two mould halves.

The hybrid component thus produced is, after ejection from the injection moulding tool, trimmed at the two front faces to the required length of the guide vane 3, where the gate area with the opening 14 for supply of the plastic melt is also removed, and then finish-machined.

LIST OF REFERENCE NUMERALS

1 Inner segment
2 Outer segment
3 Guide vanes
4 Plastic element
5 Welds
6 Bottom metal sheet
7 Top metal sheet
8 Sheet-metal shell of 5-7
9 Bottom mould half
10 Top mould half
11 Mould cavity
12 Gate
13 Arrow (plastic melt)
14 Positioning opening in 8
15 Ingate (molten material exit opening)
16 Gap between 12 and 14
17 Sealing ring
18 Sealing groove
19 Sealing edge

What is claimed is:

1. An injection molding tool for manufacturing a hybrid component having a plastic element sheathed with a sheet-metal shell, comprising:
   first and second mold halves having an inner contour matching a shape of the component; and
   a gate for injecting a plastic melt into the sheet-metal shell, wherein the gate is an integral part of the first mold half, and for correct positioning and supply of the plastic melt, projects beyond an inner surface of the first mold half into a positioning opening of the sheet-metal shell;
   a sealing groove adjoining the gate being integral with the first mold half,
   a sealing ring positioned in the sealing groove, the sealing ring elastically deformable under effect of internal pressure on the sheet-metal shell, forming a rigid sealing edge to the sheet-metal shell and simultaneously forming a labyrinth seal together with a gap remaining between the positioning opening and the gate.

2. The injection molding tool in accordance with claim 1, wherein a cross-sectional surface of the sealing groove is determined by a side running substantially vertically along the gate and by a side extending obliquely to the inner surface of the first mold half, with the sealing edge forming an obtuse angle.

3. The injection molding tool in accordance with claim 2, wherein the gate is provided in an edge area of the first mold half and is associated with a separable edge area of the component.

4. The injection molding tool in accordance with claim 3, wherein the gate has a conically opening gate runner.

5. The injection molding tool in accordance with claim 4, wherein the gate projects beyond the inner surface of the first mold half to an extent that an ingate of the gate is positioned within an inner surface of the sheet-metal shell.

6. The injection molding tool in accordance with claim 5, wherein the sealing ring is made of a heat-resistant material.

7. The injection molding tool in accordance with claim 6, wherein the hybrid component is a guide vane for arrangement inside a bypass flow duct of a gas-turbine engine.

8. The injection molding tool in accordance with claim 1, wherein the gate is provided in an edge area of the first mold half and is associated with a separable edge area of the component.

9. The injection molding tool in accordance with claim 8, wherein the gate has a conically opening gate runner.

10. The injection molding tool in accordance with claim 9, wherein the gate projects beyond the inner surface of the first mold half to an extent that an ingate of the gate is positioned within an inner surface of the sheet-metal shell.

11. The injection molding tool in accordance with claim 10, wherein the sealing ring is made of a heat-resistant material.

12. The injection molding tool in accordance with claim 11, wherein the hybrid component is a guide vane for arrangement inside a bypass flow duct of a gas-turbine engine.

13. The injection molding tool in accordance with claim 1, wherein the gate has a conically opening gate runner.

14. The injection molding tool in accordance with claim 13, wherein the gate projects beyond the inner surface of the first mold half to an extent that an ingate of the gate is positioned within an inner surface of the sheet-metal shell.

15. The injection molding tool in accordance with claim 14, wherein the sealing ring is made of a heat-resistant material.

16. The injection molding tool in accordance with claim 15, wherein the hybrid component is a guide vane for arrangement inside a bypass flow duct of a gas-turbine engine.

17. The injection molding tool in accordance with claim 1, wherein the gate projects beyond the inner surface of the first mold half to an extent that an ingate of the gate is positioned within an inner surface of the sheet-metal shell.

18. The injection molding tool in accordance with claim 17, wherein the sealing ring is made of a heat-resistant material.

19. The injection molding tool in accordance with claim 15, wherein the hybrid component is a guide vane for arrangement inside a bypass flow duct of a gas-turbine engine.

20. The injection molding tool in accordance with claim 1, wherein the sealing ring is made of a heat-resistant material.

\* \* \* \* \*